US012639790B2

(12) United States Patent
Guerreiro et al.

(10) Patent No.: US 12,639,790 B2
(45) Date of Patent: May 26, 2026

(54) IMAGE PROCESSING SYSTEM, IMAGE PROCESSING METHOD, LEARNING SYSTEM, AND INFORMATION STORAGE MEDIUM

(71) Applicant: RAKUTEN GROUP, INC., Tokyo (JP)

(72) Inventors: Julian Jorge Andrade Guerreiro, Tokyo (JP); Mitsuru Nakazawa, Tokyo (JP); Bjorn Stenger, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 414 days.

(21) Appl. No.: 18/389,812

(22) Filed: Dec. 20, 2023

(65) Prior Publication Data

US 2024/0212102 A1      Jun. 27, 2024

Related U.S. Application Data

(60) Provisional application No. 63/434,091, filed on Dec. 21, 2022.

(30) Foreign Application Priority Data

Aug. 23, 2023      (JP) ................................. 2023-135922

(51) Int. Cl.
*G06T 3/02*          (2024.01)
*G06T 3/40*          (2024.01)
(Continued)

(52) U.S. Cl.
CPC .................. *G06T 5/50* (2013.01); *G06T 3/02* (2024.01); *G06T 3/40* (2013.01); *G06T 5/60* (2024.01);
(Continued)

(58) Field of Classification Search
None
See application file for complete search history.

(56) References Cited

U.S. PATENT DOCUMENTS

2018/0260668 A1* 9/2018 Shen ..................... H04N 1/6066
2022/0301243 A1* 9/2022 Zhang ..................... G06T 11/60
(Continued)

OTHER PUBLICATIONS

Ben Xue et al., "DCCF: Deep Comprehensible Color Filter Learning Framework for High-Resolution Image Harmonization", European Conference on Computer Vision (ECCV2022), pp. 1-27, Jul. 2022 (Year: 2022).*
(Continued)

*Primary Examiner* — Beniyam Menberu
(74) *Attorney, Agent, or Firm* — HEA Law PLLC

(57)          ABSTRACT

Provided is an image processing system with at least one processor being configured to: calculate a color-adjusted pixel value vector, which is output of a transformation function defined by a formula including a term of a product of a pixel value vector and a transformation matrix, wherein the pixel value vector indicates a color of each of one or more adjustment pixels, which are at least the one or more target pixels out of pixels of the first image, and the transformation matrix has, as elements, a plurality of transformation parameters set to each of one or more adjustment pixels in a first parameter map, which is the second parameter map increased in resolution and which has the first resolution; and acquire a color-adjusted image including a color-adjusted pixel, the color-adjusted pixel having a color indicated by the color-adjusted pixel value vector.

14 Claims, 10 Drawing Sheets

(51) Int. Cl.
    *G06T 5/50*            (2006.01)
    *G06T 5/60*            (2024.01)
    *G06T 7/194*          (2017.01)

(52) U.S. Cl.
    CPC .... *G06T 7/194* (2017.01); *G06T 2207/20081*
                (2013.01); *G06T 2207/20084* (2013.01)

(56)                References Cited

U.S. PATENT DOCUMENTS

| | | | |
|---|---|---|---|
| 2022/0335659 A1* | 10/2022 | Feng ...................... | G06T 11/00 |
| 2022/0335671 A1* | 10/2022 | Erickson ................. | G06T 11/40 |
| 2024/0153038 A1* | 5/2024 | Duan ........................ | G06T 7/11 |
| 2024/0193724 A1* | 6/2024 | Gharbi ................. | G06T 3/4038 |

OTHER PUBLICATIONS

Konstantin Sofiiuk, et al., "Foreground-aware semantic representations for image harmonization." Proceedings of the IEEE/CVF Winter Conference on Applications of Computer Vision (WACV), pp. 1620-1629, Jan. 2021; Cited in the specification on p. 1, line 21 to p. 3, line 3.

Ben Xue, et al., "DCCF: Deep Comprehensible Color Filter Learning Framework for High-Resolution Image Harmonization." European Conference on Computer Vision (ECCV2022), pp. 300-316, Jul. 2022.

\* cited by examiner

FIG.5A

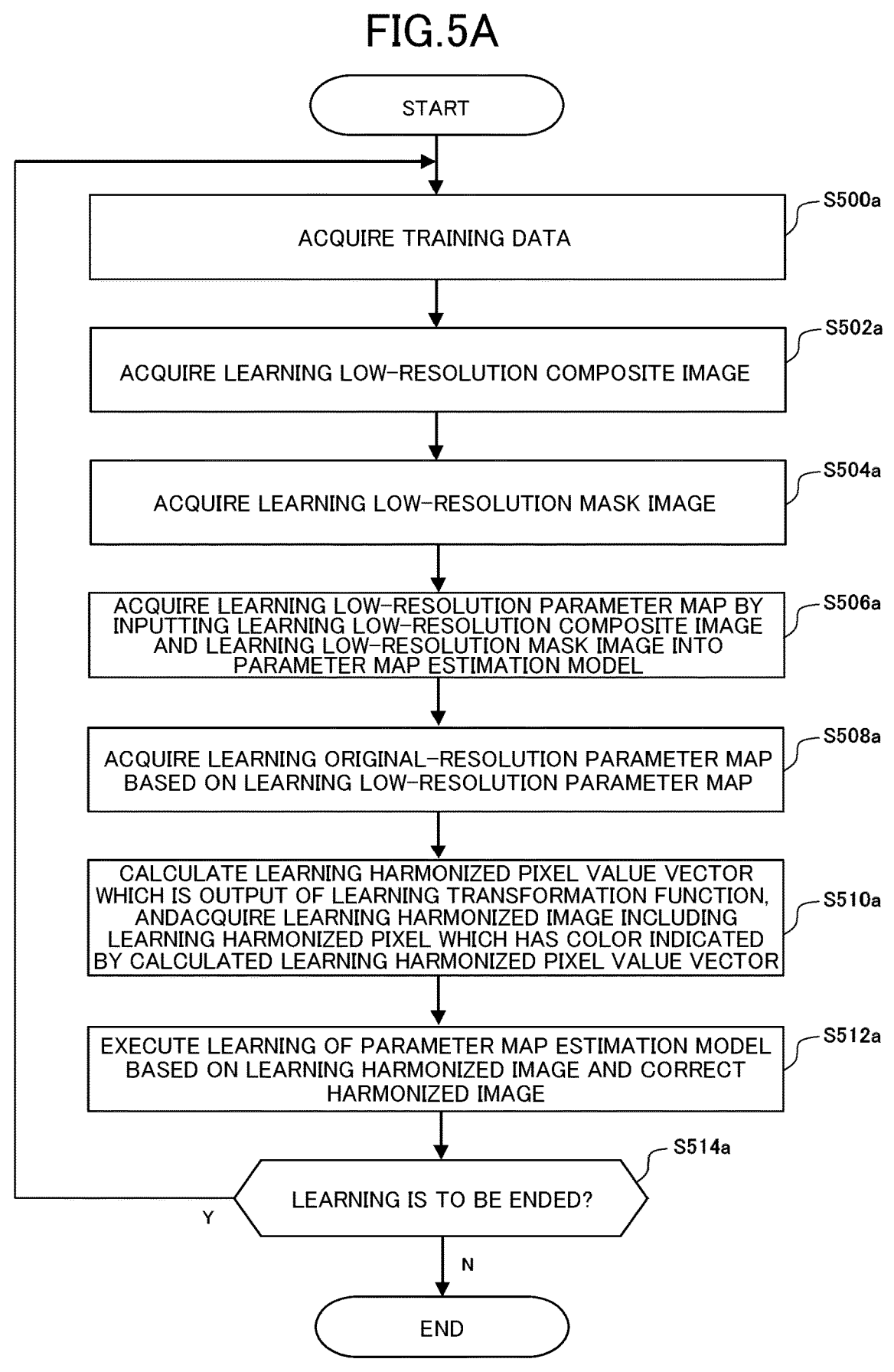

START

ACQUIRE TRAINING DATA — S500a

ACQUIRE LEARNING LOW-RESOLUTION COMPOSITE IMAGE — S502a

ACQUIRE LEARNING LOW-RESOLUTION MASK IMAGE — S504a

ACQUIRE LEARNING LOW-RESOLUTION PARAMETER MAP BY INPUTTING LEARNING LOW-RESOLUTION COMPOSITE IMAGE AND LEARNING LOW-RESOLUTION MASK IMAGE INTO PARAMETER MAP ESTIMATION MODEL — S506a

ACQUIRE LEARNING ORIGINAL-RESOLUTION PARAMETER MAP BASED ON LEARNING LOW-RESOLUTION PARAMETER MAP — S508a

CALCULATE LEARNING HARMONIZED PIXEL VALUE VECTOR WHICH IS OUTPUT OF LEARNING TRANSFORMATION FUNCTION, ANDACQUIRE LEARNING HARMONIZED IMAGE INCLUDING LEARNING HARMONIZED PIXEL WHICH HAS COLOR INDICATED BY CALCULATED LEARNING HARMONIZED PIXEL VALUE VECTOR — S510a

EXECUTE LEARNING OF PARAMETER MAP ESTIMATION MODEL BASED ON LEARNING HARMONIZED IMAGE AND CORRECT HARMONIZED IMAGE — S512a

LEARNING IS TO BE ENDED? — S514a

Y

N

END

FIG.6

| TRANSFORMATION MATRIX | ERROR |
|---|---|
| ASYMMETRIC MATRIX | 296.84 |
| SYMMETRIC MATRIX | 290.57 |

IMAGE PROCESSING SYSTEM, IMAGE PROCESSING METHOD, LEARNING SYSTEM, AND INFORMATION STORAGE MEDIUM

CROSS-REFERENCE TO RELATED APPLICATIONS

The present application claims priority from U.S. provisional application 63/434,091 filed on Dec. 21, 2022 and Japanese patent application JP 2023-135922 filed on Aug. 23, 2023, the contents of which are hereby incorporated by reference into this application.

BACKGROUND OF THE INVENTION

1. Field of the Invention

The present invention relates to an image processing system, an image processing method, a learning system, and an information storage medium.

2. Description of the Related Art

Image harmonization is known as a technology for reducing visual discomfort caused by composition of two different images (a foreground image and a background image). When a part of a foreground image is composited with a background image, visual discomfort is caused by differences in environments in which the images have been photographed and other factors. Image harmonization is a technology that reduces the visual discomfort by appropriately adjusting colors of an area originating from the foreground image in the composite image.

Hitherto, as disclosed in, for example, Konstantin Sofiiuk, Polina Popenova, and Anton Konushin, "Foreground-aware Semantic Representations for Image Harmonization," in Proceedings of the IEEE/CVF Winter Conference on Applications of Computer Vision (WACV), pages 1, 620-1, 629, January 2021, a technology related to image harmonization that uses a machine learning model such as a convolutional neural network (CNN) has been proposed. In the above-mentioned related art, the machine learning model estimates, based on the composite image, a harmonized image in which colors of an area originating from the foreground image in the composite image and colors of an area originating from the background image in the composite image are in harmony.

However, there is a difficulty in applying the above-mentioned related art to a high-resolution image. With the above-mentioned related art, the machine learning model directly estimates a harmonized image. A calculation cost required for such estimation by the machine learning model increases as the resolution of an image input into the machine learning model rises. Application of the above-mentioned related art has accordingly been limited to low-resolution (for example, 256 pixels×256 pixels) images in practice.

The problem described above applies not only to image harmonization using a machine learning model, that is, a technology for adjusting only colors of an area originating from the foreground image in the composite image, but also to technologies related to color adjustment of an image that use a machine learning model in general.

SUMMARY OF THE INVENTION

One or more embodiments of the present invention have been conceived in view of the problem described above, and an object thereof is to provide an image processing system, an image processing method, a learning system, and an information storage medium that enable color adjustment of a high-resolution image with use of a machine learning model at a low calculation cost.

Provided is an image processing system including at least one processor being configured to: acquire a first image having a first resolution; acquire a first mask image, which has the first resolution and which specifies one or more target pixels as targets of color adjustment in the first image; acquire, based on the first image, a second image having a second resolution lower than the first resolution; acquire, based on the first mask image, a second mask image having the second resolution; acquire a second parameter map having the second resolution by inputting the second image and the second mask image into a parameter map estimation model; calculate a color-adjusted pixel value vector, which is output of a transformation function defined by a formula including a term of a product of a pixel value vector and a transformation matrix, wherein the pixel value vector indicates a color of each of one or more adjustment pixels, which are at least the one or more target pixels out of pixels of the first image, and the transformation matrix has, as elements, a plurality of transformation parameters set to each of one or more adjustment pixels in a first parameter map, which is the second parameter map increased in resolution and which has the first resolution; and acquire a color-adjusted image including a color-adjusted pixel, the color-adjusted pixel having a color indicated by the color-adjusted pixel value vector, wherein the parameter map estimation model is configured to be trained with use of training data including: a first learning image having the first resolution; a first learning mask image, which has the first resolution and which specifies one or more learning target pixels as targets of color adjustment in the first learning image; and a first correct color-adjusted image having the first resolution, so as to decrease an error of a first learning color-adjusted image with respect to the first correct color-adjusted image, wherein the first learning color-adjusted image includes a learning color-adjusted pixel, which has a color indicated by a learning color-adjusted pixel value vector, the learning color-adjusted pixel value vector being output of a learning transformation function defined by a formula in a same format as a format of the transformation function, the formula including a term of a product of a learning pixel value vector a learning transformation matrix, wherein the learning pixel value vector indicates a color of each of one or more learning adjustment pixels, which are at least the one or more learning target pixels out of pixels of the first learning image, and the learning transformation matrix has, as elements, a plurality of learning transformation parameters set to each of one or more learning adjustment pixels in a first learning parameter map having the first resolution, wherein the first learning parameter map is a second learning parameter map increased in resolution, the second learning parameter map being output of the parameter map estimation model into which a second learning image and a second learning mask image are input, wherein the second learning image is the first learning image reduced in resolution and has the second resolution, and the second learning mask image is the first learning mask image reduced in resolution and has the second resolution.

BRIEF DESCRIPTION OF THE DRAWINGS

FIG. 5A is a flow chart for illustrating an example of processing executed in the image processing system.

FIG. 6 is a table for showing results of a comparison between a case in which a transformation matrix is an asymmetric matrix and a case in which the transformation matrix is a symmetric matrix.

DETAILED DESCRIPTION OF THE INVENTION

Now, at least one embodiment of the present invention is described with reference to the drawings.

1. HARDWARE CONFIGURATION OF IMAGE PROCESSING SYSTEM

Figure 1:
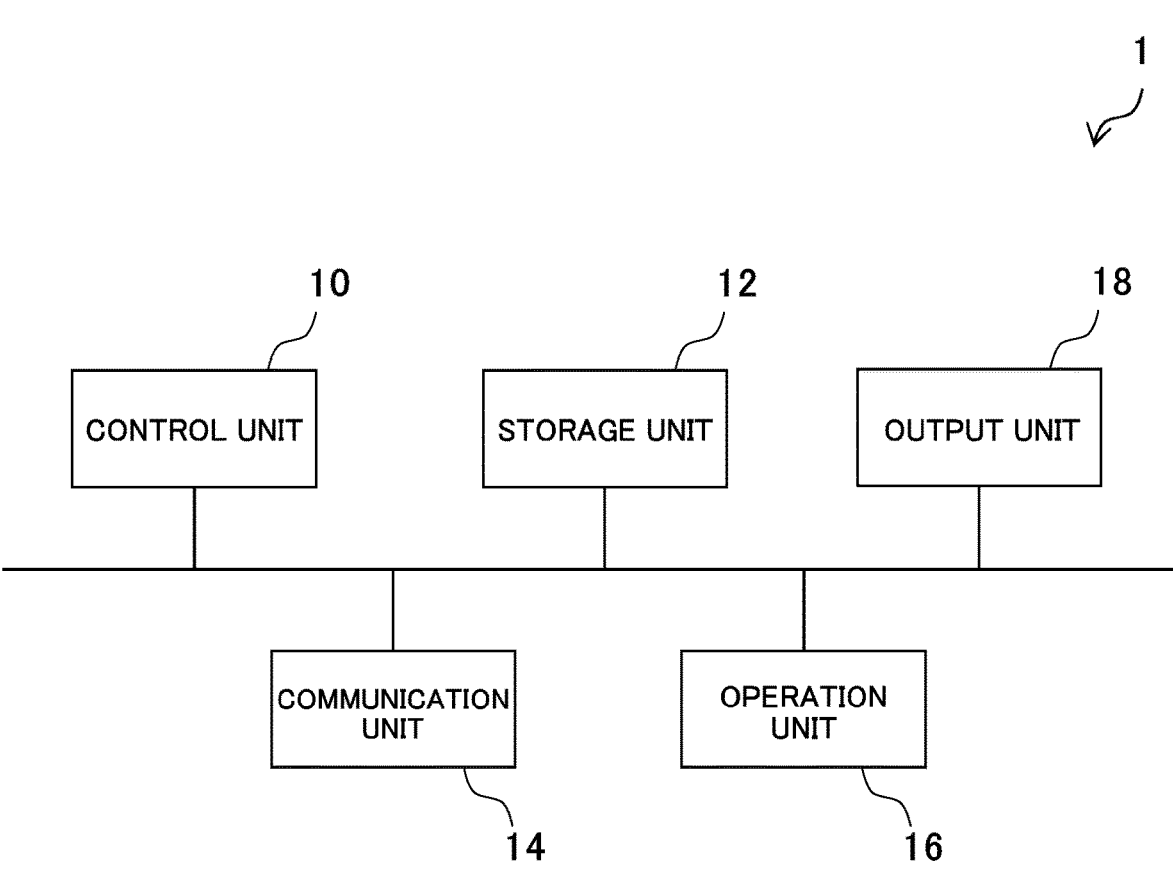
FIG. 1 is a diagram for illustrating an example of a hardware configuration of an image processing system according to at least one embodiment of the present invention.

FIG. 1 is a diagram for illustrating an example of a hardware configuration of an image processing system 1 according to the at least one embodiment of the present invention. The image processing system 1 according to the at least one embodiment is a computer such as a personal computer. As illustrated in FIG. 1, the image processing system 1 includes, for example, a control unit 10, a storage unit 12, a communication unit 14, an operation unit 16, and an output unit 18.

The control unit 10 is, for example, a program-controlled device such as a microprocessor, which operates in accordance with a program installed in the image processing system 1. The control unit 10 includes at least one processor.

The storage unit 12 is, for example, a storage element such as a ROM or a RAM, a hard disk drive (HDD), or a solid-state drive (SSD) including a flash memory. The storage unit 12 stores, for example, a program to be executed by the control unit 10.

The communication unit 14 is a communication interface for wired communication or wireless communication, such as a network interface card, and exchanges data with another computer or terminal through a computer network such as the Internet.

The operation unit 16 is an input device, and includes, for example, a pointing device such as a touch panel or a mouse, or a keyboard. The operation unit 16 transmits operation content to the control unit 10. The output unit 18 is an output device, for example, a display such as a liquid crystal output unit or an organic EL output unit, or an audio output device such as a speaker.

Programs and data stored into the storage unit 12 may be supplied thereto from another computer via the network. Further, the hardware configuration of the image processing system 1 is not limited to the above-mentioned example, and various types of hardware can be applied thereto. For example, the image processing system 1 may include a reading unit (for example, an optical disc drive or a memory card slot) which reads a computer-readable information storage medium, or an input/output unit (for example, a USB port) for inputting and outputting data to/from an external device. For example, the program and the data stored in the information storage medium may be supplied to the image processing system 1 through intermediation of the reading unit or the input/output unit. The image processing system 1 may be configured from a plurality of computers.

2. OUTLINE OF IMAGE PROCESSING SYSTEM

Figure 2A:
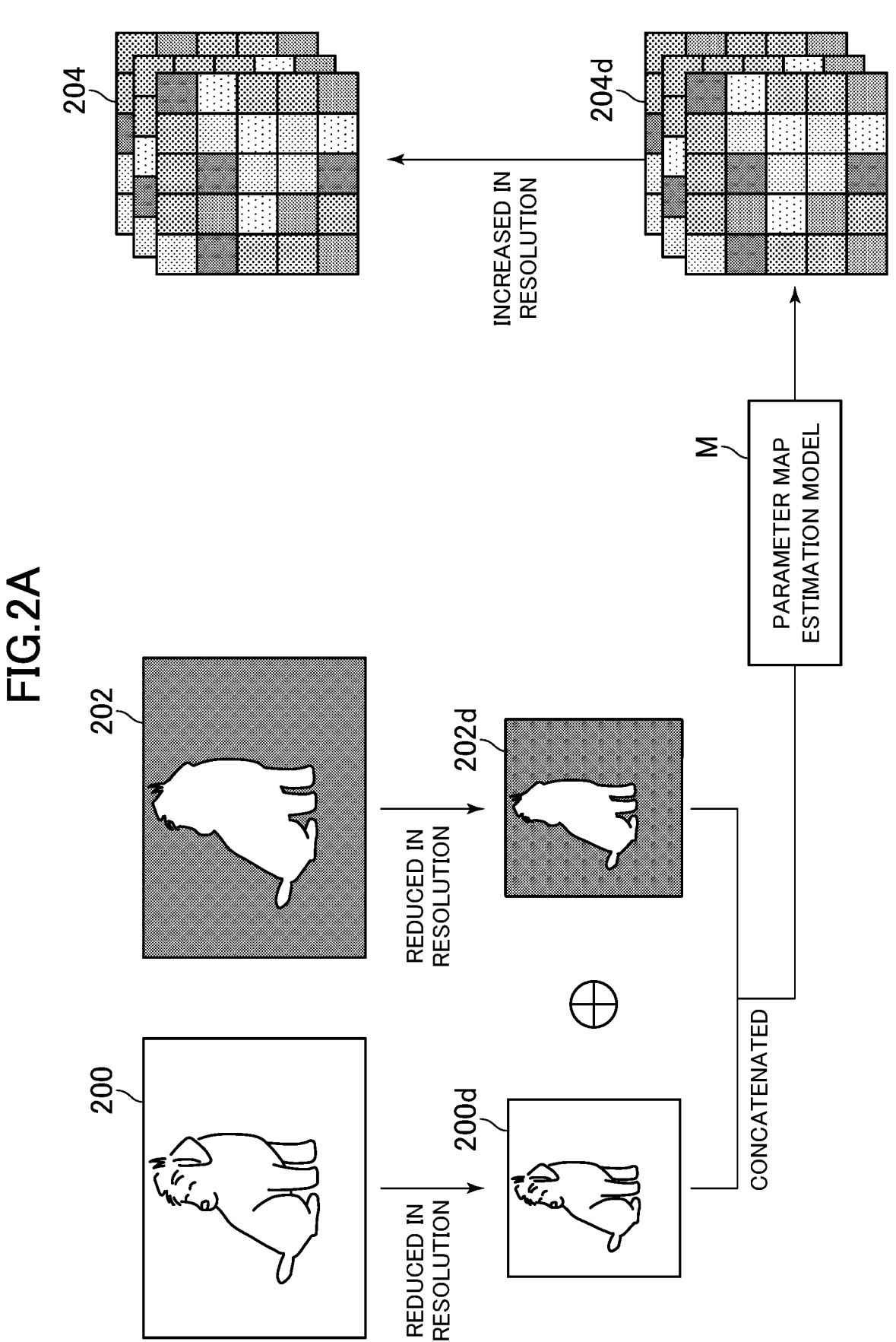
FIG. 2A is a diagram for illustrating an outline of the image processing system.
Figure 2B:
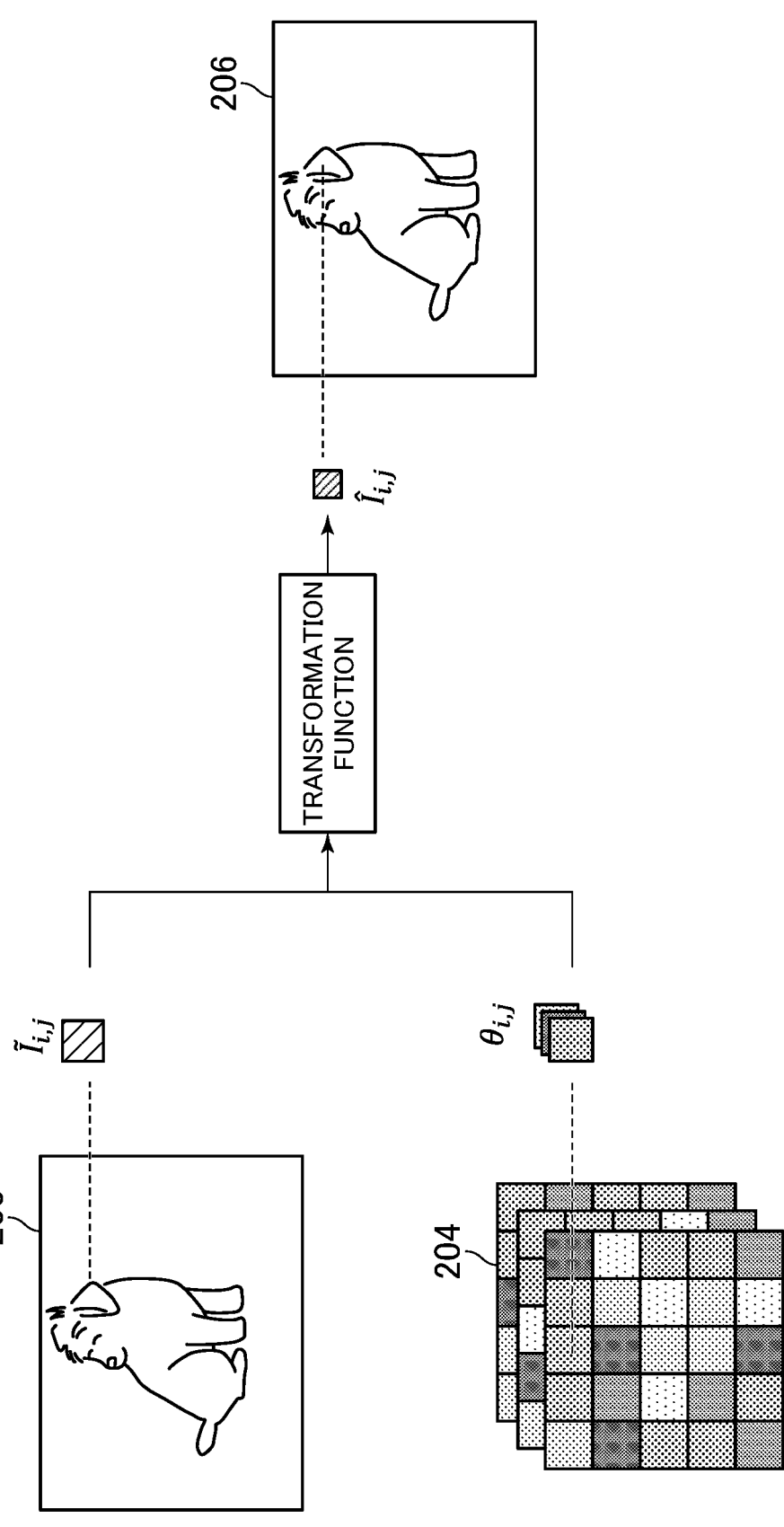
FIG. 2B is a diagram for illustrating the outline of the image processing system.

In the following, an outline of the image processing system 1 is described with reference to FIG. 2A and FIG. 2B. FIG. 2A and FIG. 2B are diagrams for illustrating an outline of the image processing system 1. In the at least one embodiment, the description takes a case in which the image processing system 1 is used for image harmonization of a composite image 200 as an example. In FIG. 2A and FIG. 2B, an image in which a foreground image having a dog as a photographic subject and a background image having ground of a park as a photographic subject are composited is shown as an example of the composite image 200. In the present application, image harmonization refers to adjustment of colors of an area originating from a foreground image (in FIG. 2A and FIG. 2B, an area in which a dog is displayed in the composite image 200) in a composite image.

Processing steps executed in the image processing system 1 mainly include: (1) acquisition of a composite image and a mask image; (2) acquisition of a low-resolution composite image and a low-resolution mask image; (3) acquisition of a low-resolution parameter map; (4) acquisition of an original-resolution parameter map; and (5) acquisition of a harmonized image. Outlines of the processing steps are described below.

2-1. Acquisition of Composite Image and Mask Image

First, the image processing system 1 acquires the composite image 200 and a mask image 202 (FIG. 2A). The composite image 200 has a predetermined resolution (hereinafter referred to as "first resolution"). Here, a resolution means the number of pixels of an image. The composite image 200 is a three-dimensional array of width W×height H×3 channels. The width W and the height H here are the number of pixels in a width direction of the composite image 200 and the number of pixels in a height direction of the composite image 200, respectively. The three channels of the composite image 200 correspond to R, G, and B, respectively.

The mask image 202 is an image for specifying a plurality of target pixels that are targets of color adjustment in the composite image 200. In the at least one embodiment, the target pixels are pixels in the area originating from the foreground image in the composite image 200. The mask image 202 is specifically a binary image in which the target pixels have a pixel value of 1 and pixels other than the target pixels have a pixel value of 0. The mask image 202 has the first resolution as well. The mask image 202 having the first resolution is a three-dimensional array of the width W×the height H×1 channel.

2-2. Acquisition of Low-Resolution Composite Image and Low-Resolution Mask Image The image processing system 1 acquires a low-resolution composite image 200*d* based on the composite image 200 (FIG. 2A). The low-resolution composite image 200*d* has a resolution lower than the first resolution (hereinafter referred to as "second resolution"). The image processing system 1 acquires the low-resolution composite image 200*d* by a reduction in resolution (down-sampling) of the composite image 200 (FIG. 2A). The low-resolution composite image 200*d* is a three-dimensional array of width $W_d$×height $H_d$×3 channels. The width $W_d$ and the height $H_d$ here are the number of pixels in a width direction of the low-resolution composite image 200*d* and the number of pixels in a height direction of the low-resolution composite image 200*d*, respectively, and satisfy W>$W_d$ and H>$H_d$, respectively. The three channels of the low-resolution composite image 200*d* correspond to R, G, and B, respectively.

The image processing system 1 also acquires a low-resolution mask image 202*d* based on the mask image 202. The low-resolution mask image 202*d* has the second resolution as well. The low-resolution mask image 202*d* is a three-dimensional array of the width $W_d$×the height $H_d$×1 channel.

2-3. Acquisition of Low-Resolution Parameter Map

The image processing system 1 inputs the low-resolution composite image 200*d* and the low-resolution mask image 202*d* into a parameter map estimation model M, thereby acquires a low-resolution parameter map 204*d* (FIG. 2A).

Twelve low-resolution transformation parameters are set to each pixel of the low-resolution parameter map 204*d*. The low-resolution parameter map 204*d* is a three-dimensional array of the width $W_d$×the height $H_d$×12 channels. Channels of a low-resolution parameter map 204*d* correspond to the twelve low-resolution transformation parameters, respectively.

The parameter map estimation model M is a trained machine learning model that has been trained so that the low-resolution parameter map 204*d* is output when the low-resolution composite image 200*d* and the low-resolution mask image 202*d* are input. In the at least one embodiment, an example in which a concatenation of the low-resolution composite image 200*d* and the low-resolution mask image 202*d* is input into the parameter map estimation model M (FIG. 2A) is shown. However, the low-resolution composite image 200*d* and the low-resolution mask image 202*d* may be separately input into the parameter map estimation model M.

2-4. Acquisition of Original-Resolution Parameter Map

The image processing system 1 acquires the original-resolution parameter map 204 based on the low-resolution parameter map 204*d* (FIG. 2A). The original-resolution parameter map 204 has the first resolution, that is, the same resolution as the resolution of the composite image 200 and the mask image 202. The image processing system 1 acquires the original-resolution parameter map 204 by an increase in resolution (up-sampling) of the low-resolution parameter map 204*d*.

Twelve transformation parameters are set to each pixel of the original-resolution parameter map 204. The twelve transformation parameters set to each pixel of the original-resolution parameter map 204 are, as described later, used to transform pixel values of those pixels in the composite image 200. The original-resolution parameter map 204 is a three-dimensional array of the width W×the height H×12 channels. The twelve channels of the original-resolution parameter map 204 correspond to the twelve transformation parameters, respectively.

2-5. Acquisition of Harmonized Image

The image processing system 1 calculates a harmonized pixel value vector, which is output of a transformation function defined by a formula including a term of a product of a pixel value vector that indicates a color of each of the plurality of target pixels of the composite image 200 and a transformation matrix, thereby acquires a harmonized image 206 including a harmonized pixel, which has a color indicated by the harmonized pixel value vector (FIG. 2B). Here, the transformation matrix has, as elements, the twelve transformation parameters set to each of the plurality of target pixels in the original-resolution parameter map 204. Details of the transformation function are described later (see description about Equation 1).

Preliminary Summation

As described above, according to the image processing system 1 of the at least one embodiment, (1) the composite image 200 and the mask image 202 are acquired, (2) the low-resolution composite image 200*d* and the low-resolution mask image 202*d* are acquired, (3) the low-resolution parameter map 204*d* is acquired by inputting the low-resolution composite image 200*d* and the low-resolution mask image 202*d* into the parameter map estimation model M, (4) the original-resolution parameter map 204 is acquired based on the low-resolution parameter map 204*d*, and (5) the harmonized pixel value vector, which is output of the transformation function defined by the formula including the term of the product of the pixel value vector and the transformation matrix, is calculated, and the harmonized image 206 including the harmonized pixel, which has a color indicated by the harmonized pixel value vector, is thus acquired (FIG. 2A and FIG. 2B).

Image harmonization using a machine learning model of the related art uses a machine learning model into which a composite image and a mask image are input and from which a harmonized image is output. A calculation cost required for estimation by such a machine learning model increases as the resolution of the image input into the machine learning model rises. Accordingly, application of image harmonization using a machine learning model of the related art has been limited to low-resolution (for example, 256 pixels×256 pixels) images in practice.

In contrast, according to the image processing system 1 of the at least one embodiment, the adoption of the configuration described above enables avoidance of use of a machine learning model that has been used in image harmonization of the related art and that outputs a harmonized image from a composite image and a mask image input thereto. As a result, the calculation cost required for image harmonization can be reduced and image harmonization of a high-resolution composite image can be accomplished at a low calculation cost. The following is description on details of this image processing system 1.

3. FUNCTIONS IMPLEMENTED IN IMAGE PROCESSING SYSTEM

Figure 3A:
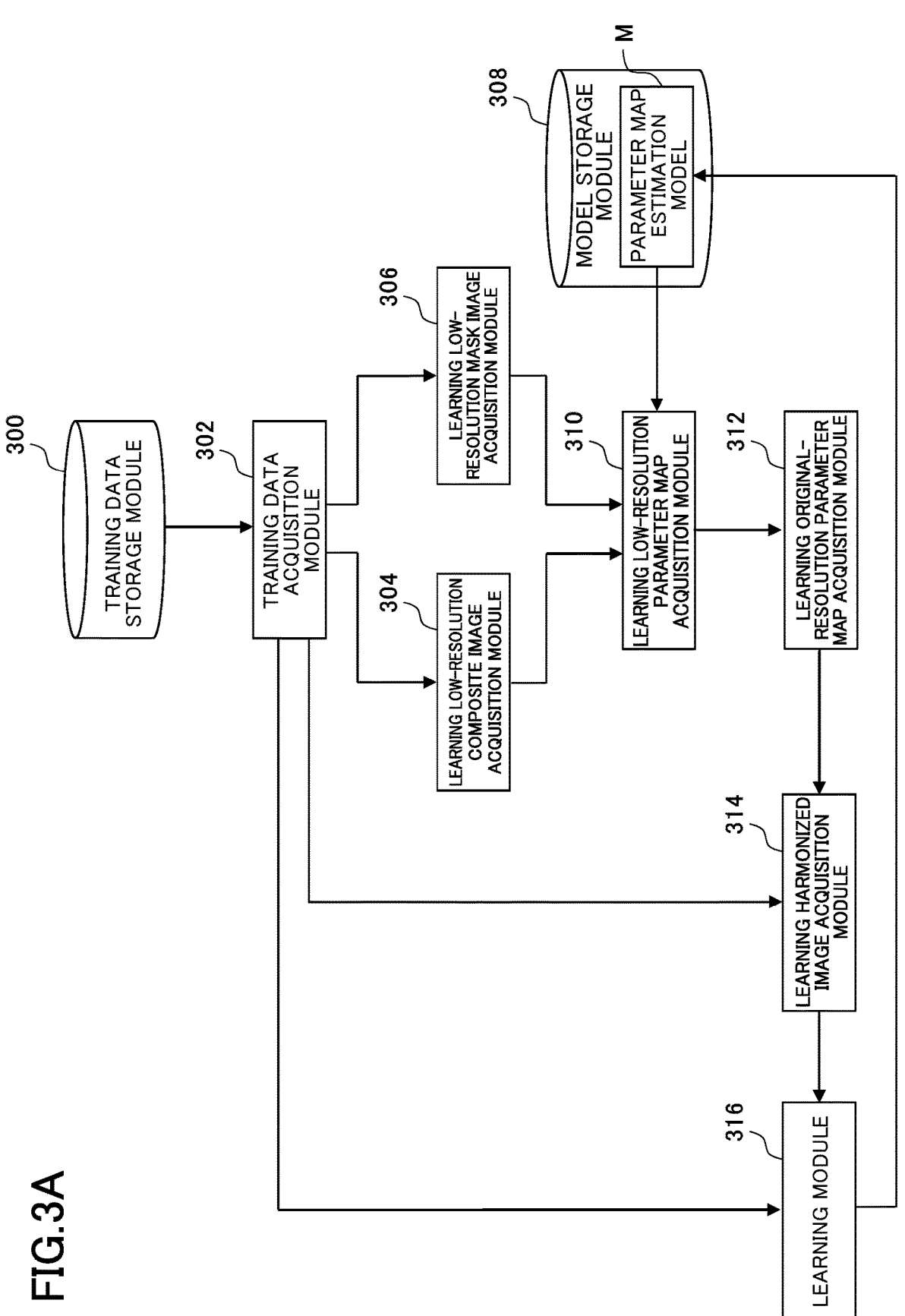
FIG. 3A is a function block diagram for illustrating an example of functions implemented in the image processing system.
Figure 3B:
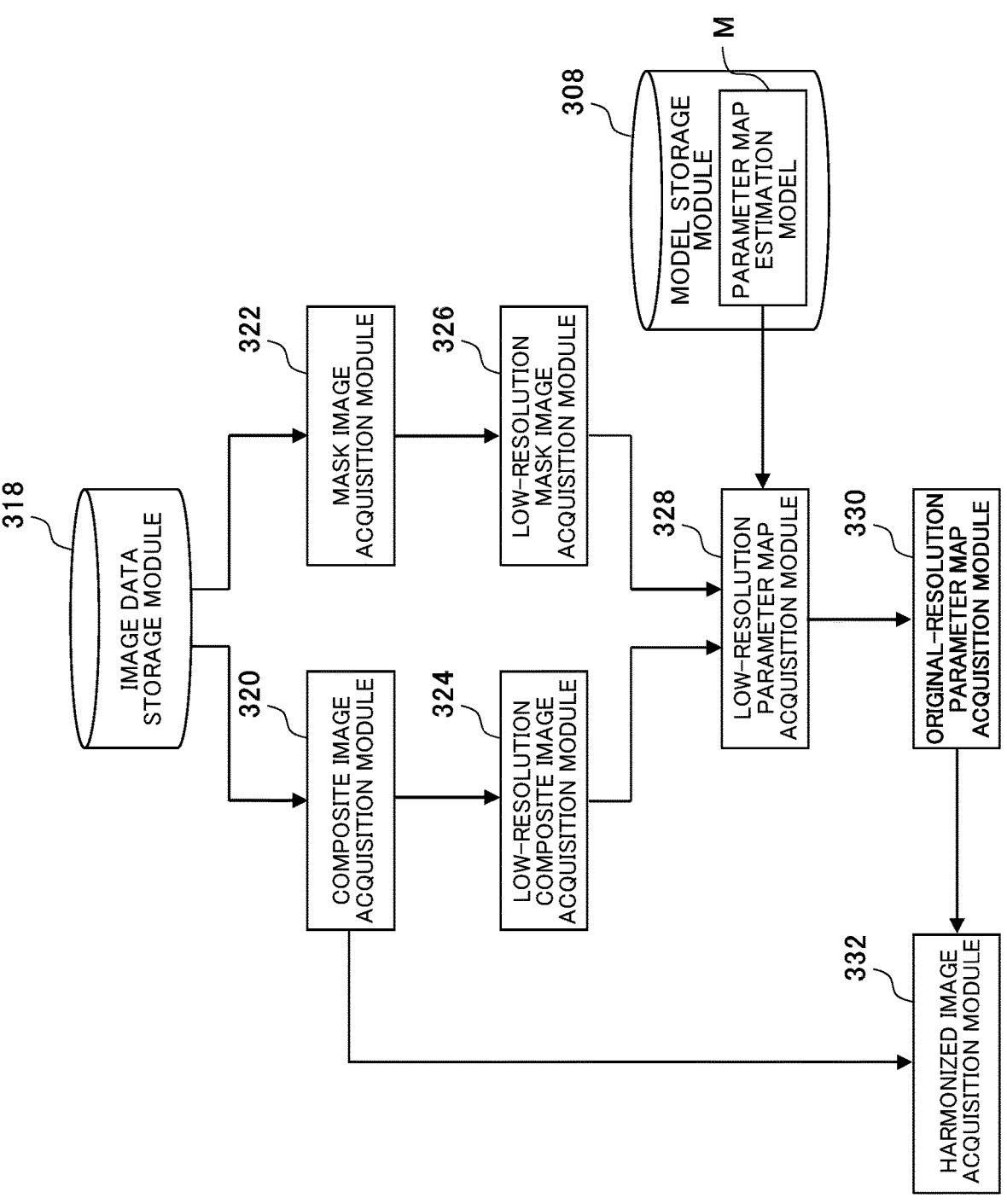
FIG. 3B is another function block diagram for illustrating an example of functions implemented in the image processing system.

FIG. 3A and FIG. 3B are each a function block diagram for illustrating an example of functions implemented in the image processing system 1. The function block diagram of FIG. 3A is illustration of, out of the functions implemented in the image processing system 1, functions as a learning system which executes learning of the parameter map estimation model M (functions related to learning). The function block diagram of FIG. 3B is illustration of, out of the functions implemented in the image processing system 1, as functions an image harmonization system which acquires the harmonized image 206 (functions related to image harmonization). In the following description of the functions implemented in the image processing system 1, the functions as the learning system and the functions as the image harmonization system are separately described with reference to FIG. 3A and FIG. 3B, respectively.

3-1. Functions as Learning System

As illustrated in FIG. 3A, in the image processing system 1, a training data storage module 300, a training data acquisition module 302, a learning low-resolution composite image acquisition module 304, a learning low-resolution mask image acquisition module 306, a model storage module 308, a learning low-resolution parameter map acquisition module 310, a learning original-resolution parameter map acquisition module 312, a learning harmonized image acquisition module 314, and a learning module 316 are implemented. The training data storage module 300 and the model storage module 308 are implemented mainly by the storage unit 12. The training data acquisition module 302, the learning low-resolution composite image acquisition module 304, the learning low-resolution mask image acquisition module 306, the learning low-resolution parameter map acquisition module 310, the learning original-resolution parameter map acquisition module 312, the learning harmonized image acquisition module 314, and the learning module 316 are implemented mainly by the control unit 10.

FIG. 2A and FIG. 2B may be referred to below for the convenience of description. In the following description, a learning composite image, a learning mask image, a learning low-resolution composite image, a learning low-resolution mask image, a learning low-resolution parameter map, a learning original-resolution parameter map, and a learning harmonized image correspond to the composite image 200, the mask image 202, the low-resolution composite image 200*d*, the low-resolution mask image 202*d*, the low-resolution parameter map 204*d*, the original-resolution parameter map 204, and the harmonized image 206, respectively, of FIG. 2A and FIG. 2B.

Note that the learning composite image, the learning mask image, the learning low-resolution composite image, the learning low-resolution mask image, the learning low-resolution parameter map, the learning original-resolution parameter map, and the learning harmonized image differ from the composite image 200, the mask image 202, the low-resolution composite image 200*d*, the low-resolution mask image 202*d*, the low-resolution parameter map 204*d*, the original-resolution parameter map 204, and the harmonized image 206, respectively.

Training Data Storage Module

The training data storage module 300 stores a plurality of sets of training data. Each set of training data includes a learning composite image (a first learning image), a learning mask image (a first learning mask image) for specifying one or more learning target pixels that are targets of color adjustment in the learning composite image, and a correct harmonized image (a first correct color-adjusted image). The learning composite image, the learning mask image, and the correct harmonized image each have the first resolution. A case in which the first resolution is 1,920 pixels×1,080 pixels is described in the at least one embodiment as an example, but the first resolution may be any resolution. In the at least one embodiment, the training data further includes an incorrect harmonized image described later.

The learning composite image is an image in which a learning foreground image and a learning background image are composited. The learning mask image specifies one or more pixels originating from the learning foreground image in the learning composite image as one or more target pixels. The correct harmonized image is correct data (ground truth) given to a pair of the learning composite image and the learning mask image. The correct harmonized image is obtained by, for example, artificially adjusting colors of one or more pixels originating from the learning foreground image in the corresponding learning composite image.

Training Data Acquisition Module

The training data acquisition module 302 acquires the training data. In the at least one embodiment, the training data acquisition module 302 acquires the training data stored in the training data storage module 300. However, the training data may be recorded on another device or an information storage medium, and the training data acquisition module 302 may acquire the training data from the device or the information storage medium.

Learning Low-Resolution Composite Image Acquisition Module

The learning low-resolution composite image acquisition module 304 (second-learning image acquisition means) acquires, based on the learning composite image, the learning low-resolution composite image (a second learning image) having the second resolution (see FIG. 2A). Specifically, the learning low-resolution composite image acquisition module 304 acquires the learning low-resolution composite image by a reduction in resolution (down-sampling) of the learning composite image. As a method of interpolation for the reduction in resolution, publicly-known methods such as bilinear interpolation, bicubic interpolation, and Lanczos interpolation may be used. In the at least one embodiment, a case in which the second resolution is 256 pixels×256 pixels is described as an example. However, the second resolution can be any resolution that is lower than the first resolution.

Learning Low-Resolution Mask Image Acquisition Module

The learning low-resolution mask image acquisition module 306 (second-learning mask image acquisition means) acquires, based on the learning mask image, the learning low-resolution mask image (a second learning mask image) having the second resolution (see FIG. 2A). Specifically, the learning low-resolution mask image acquisition module 306 acquires the learning low-resolution mask image by a reduction in resolution (down-sampling) of the learning mask image. As a method of interpolation for the reduction in resolution, any publicly-known methods are usable as is the case for the learning low-resolution composite image acquisition module 304.

Model Storage Module

The model storage module 308 stores the parameter map estimation model M. Specifically, the model storage module 308 stores a structure and parameters of the parameter map estimation model M.

Parameter Map Estimation Model

The parameter map estimation model M is a machine learning model into which the learning low-resolution composite image and the learning low-resolution mask image are input and from which the learning low-resolution parameter map is output (see FIG. 2A). At an image harmonization stage, the low-resolution composite image 200d and the low-resolution mask image 202d are input into the parameter map estimation model M, and the low-resolution parameter map 204d is output from the parameter map estimation model M.

Figure 4:
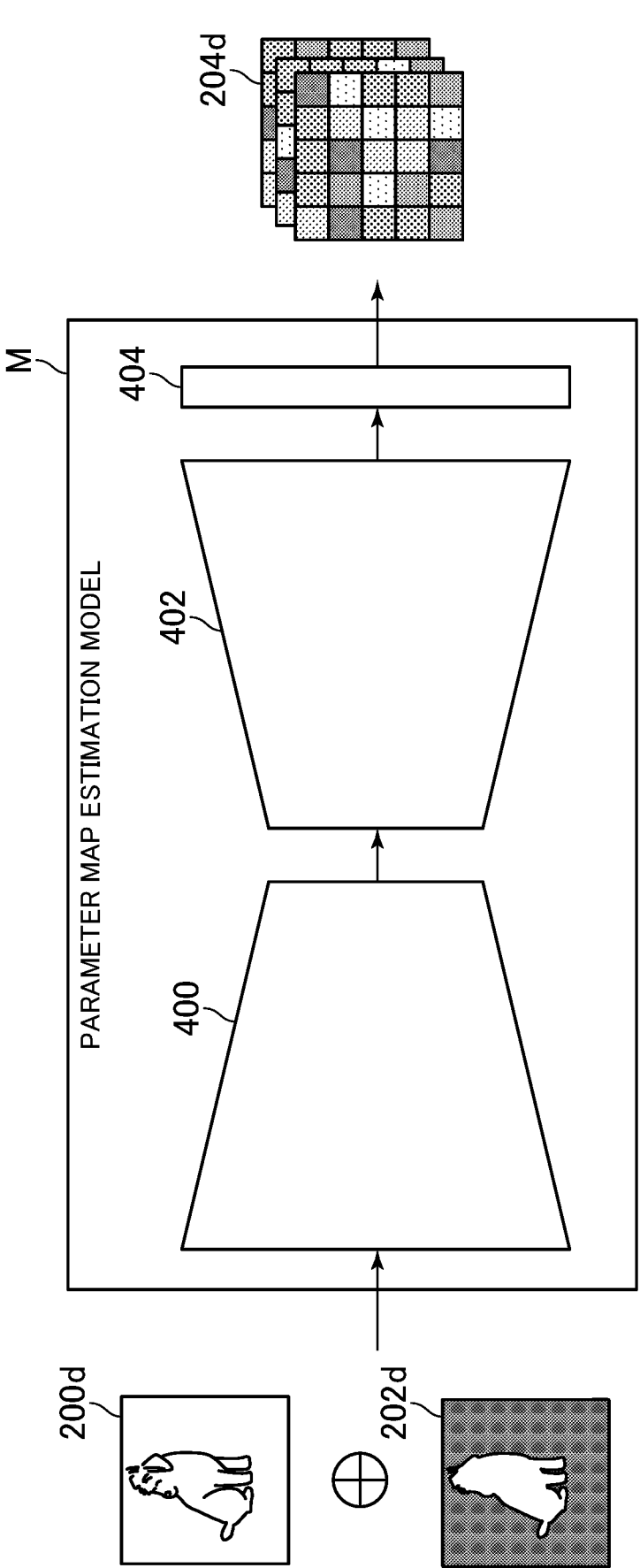
FIG. 4 is a diagram for illustrating an example of a parameter map estimation model.

FIG. 4 is a diagram for illustrating an example of the parameter map estimation model M. In the at least one embodiment, a case in which a convolutional neural network (CNN) is used as the parameter map estimation model M is described as an example. The structure of the parameter map estimation model M is not limited to the example illustrated in FIG. 4, and can be suitably changed.

The parameter map estimation model M includes an encoder module 400, a decoder module 402, and a dimension adjustment module 404 (see FIG. 4). The encoder module 400 receives the learning low-resolution composite image and the learning low-resolution mask image input thereto, and outputs a learning feature map. The learning feature map output from the encoder module 400 is input into the decoder module 402, and the decoder module 402 outputs a learning pre-adjustment low-resolution parameter map.

The learning pre-adjustment low-resolution parameter map has the second resolution, and C (C≠12) low-resolution transformation parameters are set to each pixel of the learning pre-adjustment low-resolution parameter map. That is, the learning pre-adjustment low-resolution parameter map is a three-dimensional array of the width $W_d$×the height $H_d$×C channels.

The dimension adjustment module 404 receives the learning pre-adjustment low-resolution parameter map input thereto, and outputs the learning low-resolution parameter map. The dimension adjustment module 404 is a convolutional layer having a kernel size of, for example, 1×1.

Learning Low-Resolution Parameter Map Acquisition Module

The learning low-resolution parameter map acquisition module 310 (second-learning parameter map acquisition means) acquires the learning low-resolution parameter map (a second learning parameter map) having the second resolution by inputting the learning low-resolution composite image and the learning low-resolution mask image into the parameter map estimation model M (see FIG. 2A). In the at least one embodiment, the learning low-resolution parameter map acquisition module 310 uses the parameter map estimation model M stored in the model storage module 308. However, the parameter map estimation model M may be recorded on another device or an information storage medium, and the learning low-resolution parameter map acquisition module 310 may acquire the parameter map estimation model M from the device or the information storage medium.

In the at least one embodiment, the learning low-resolution parameter map acquisition module 310 acquires the learning low-resolution parameter map by inputting a concatenation of the learning low-resolution composite image and the learning low-resolution mask image into the parameter map estimation model M (FIG. 2A). The learning low-resolution parameter map acquisition module 310 may separately input the learning low-resolution composite image and the learning low-resolution mask image into the parameter map estimation model M.

Twelve learning low-resolution transformation parameters are set to each pixel of the learning low-resolution parameter map. The learning low-resolution parameter map is a three-dimensional array of the width $W_d$×the height $H_d$×12 channels. The twelve channels of the learning low-resolution parameter map correspond to the twelve learning low-resolution transformation parameters, respectively.

Learning Original-Resolution Parameter Map Acquisition Module

The learning original-resolution parameter map acquisition module 312 acquires, based on the learning low-resolution parameter map, the learning original-resolution parameter map (a first learning parameter map) (see FIG. 2A). Specifically, the learning original-resolution parameter map acquisition module 312 acquires the learning original-resolution parameter map by an increase in resolution (up-sampling) of the learning low-resolution parameter map. As a method of interpolation for the increase in resolution, publicly-known methods such as bilinear interpolation, bicubic interpolation, and Lanczos interpolation may be used.

Twelve learning transformation parameters are set to each pixel of the learning original-resolution parameter map. That is, the learning original-resolution parameter map is a three-dimensional array of the width W×the height H×12 channels. The twelve channels of the learning original-resolution parameter map correspond to the twelve learning transformation parameters, respectively. The twelve learning transformation parameters set to each pixel of the learning original-resolution parameter map are, as described later, used by the learning harmonized image acquisition module 314 to transform pixel values of those pixels in the learning composite image.

Learning Harmonized Image Acquisition Module

The learning harmonized image acquisition module 314 (learning color-adjusted image acquisition means) calculates a learning harmonized pixel value vector (a learning color-adjusted pixel value vector), which is output of a learning transformation function, and acquires the learning harmonized image (a learning color-adjusted image) including a learning harmonized pixel (a learning color-adjusted pixel), which has a color indicated by the learning harmonized pixel value vector (see FIG. 2B).

The learning transformation function is defined by a formula including a term of a product of a learning pixel value vector and a learning transformation matrix. The learning pixel value vector indicates a color of each one of the plurality of learning target pixels of the learning composite image. In the at least one embodiment, the learning pixel value vector is a three-dimensional vector having, as elements, an R value, a G value, and a B value of the one of the plurality of learning target pixels. The learning transformation matrix has, as elements, the plurality of (twelve in the at least one embodiment) learning transformation parameters set to the plurality of learning target pixels in the learning original-resolution parameter map.

In the at least one embodiment, the learning transformation function is an affine transformation including a product of the learning pixel value vector and the learning transformation matrix. Specifically, as shown in Equation 1 below, the formula that defines the learning transformation function is expressed by a sum of a term that is a product of a learning pixel value vector p and a learning transformation matrix $W_\theta$ having, as elements, some of the learning transformation parameters set to a pixel that are related to the learning pixel value vector p in the learning original-resolution parameter map, and a term of a learning transformation vector be having, as elements, some others of the learning transformation parameters set to the pixel that are related to the learning pixel value vector p in the learning original-resolution parameter map. More specifically, the learning transformation matrix $W_\theta$ has nine learning transformation parameters as elements, the learning transformation vector be has three learning transformation parameters as elements. In the at least one embodiment, the learning transformation vector is a symmetric matrix. It can be said that the learning harmonized image acquisition module 314 maps the learning pixel value vector to the learning harmonized pixel value vector in the same color space by the learning transformation function.

$$\hat{I}_{i,j} = W_\theta \cdot p + b_\theta, \qquad \text{[Equation 1]}$$

$$W_\theta = \begin{pmatrix} \theta_1 & \theta_2 & \theta_3 \\ \theta_4 & \theta_5 & \theta_6 \\ \theta_7 & \theta_8 & \theta_9 \end{pmatrix}, p = \begin{pmatrix} p_R \\ p_G \\ p_B \end{pmatrix}, b_\theta = \begin{pmatrix} \theta_{10} \\ \theta_{11} \\ \theta_{12} \end{pmatrix}$$

In Equation 1 given above, $\hat{I}_{i,j}$ represents a learning harmonized pixel value vector indicating a color of a learning harmonization pixel in an i-th row and a j-th column in the learning harmonized image, $\theta_n$ (n=1, 2 ... 12) represents a learning transformation parameter set to a pixel in the i-th row and the j-th column in the learning original-resolution parameter map, and $p_R$, $p_G$, and $p_B$ are the R value, the G value, and the B value, respectively, of a learning target pixel in the i-th row and the j-th column in the learning composite image.

Learning Module

The learning module 316 executes learning of the parameter map estimation model M based on the learning harmonized image and the correct harmonized image. Specifically, the learning module 316 executes learning of the parameter map estimation model M so that an error of the learning harmonized image with respect to the correct harmonized image decreases.

In the at least one embodiment, as shown in Equation 2 below, a loss function L which is an error of the learning harmonized image with respect to the correct harmonized image is normalized based on the learning mask image.

$$\mathcal{L} = \frac{\sum_{i,j,} (\hat{I}_{i,j} - I_{i,j})^2}{\max\left(A_{min}, \sum_{i,j} M_{i,j}\right)} \qquad \text{[Equation 2]}$$

In Equation 2 given above, $\hat{I}_{i,j}$ represents the pixel value of a pixel in the i-th row and the j-th column in the learning harmonized image, $I_{i,j}$ represents the pixel value of a pixel in the i-th row and the j-th column in the correct harmonized image, $A_{min}$ represents a predetermined threshold value, and $M_{i,j}$ represents the pixel value of a pixel in the i-th row and the j-th column in the learning mask image. A denominator of Equation 2 represents the largest value of $A_{min}$ and $\Sigma_{i,j} N_{i,j}$.

The learning module 316 further executes learning of the parameter map estimation model M so as to increase the degree of similarity between the learning harmonized image and the correct harmonized image, so as to decrease the degree of similarity between the learning harmonized image and the incorrect harmonized image (first incorrect color-adjusted image), which differs from the correct harmonized image. The incorrect harmonized image is an image obtained by transforming the pixel values of the learning target pixels in the correct harmonized image.

The learning module 316 also executes learning of the parameter map estimation model M so as to decrease a difference of the degree of a match between an area originating from the learning foreground image in the learning harmonized image and an area originating from the learning background image in the learning harmonized image from the degree of the match in the correct harmonized image, so as to increase a difference of the degree of the match in the learning harmonized image from the degree of the match in the incorrect harmonized image.

Specifically, the learning module 316 executes learning of the parameter map estimation model M so that a contrastive loss function LCR shown in Equation 3 below decreases.

$$\mathcal{L}_{CR} = \qquad \text{[Equation 3]}$$

$$\frac{D(f, f^+)}{D(f, f^+) + \sum_{k=1}^{K} D(f, f^-)} + \frac{D(c, c^+)}{D(c, c^+) + \sum_{k=1}^{K} D(c, c^-)}$$

In Equation 3 given above, D(•) represents L1 norm, and f, $f^+$, and $f^-$ are feature vectors of areas originating from the learning foreground images in the learning harmonized image, in the correct harmonized image, and in the incorrect harmonized image, respectively. The feature vectors f, $f^+$, and $f^-$ may be obtained based on the learning harmonized image, the correct harmonized image, and the incorrect harmonized image, respectively, with use of a trained feature extractor. In Equation 3, c, $c^+$, and $c^-$ represent the degrees of a match between an area originating from the learning foreground image and an area originating from the learning background image in the learning harmonized image, in the correct harmonized image, and in the incorrect harmonized image, respectively. The degrees of a match c, $c^+$, and $c^-$ are respectively calculated by formulae of Equation 4 given below.

$$c = \text{gram}(f, b^+) \qquad \text{[Equation 4]}$$
$$c^+ = \text{gram}(f^+, b^+)$$
$$c^- = \text{gram}(f^-, b^+)$$

In Equation 4 given above, gram(•) represents a gram matrix, and $b^+$ represents a feature vector of the area originating from the learning background image in the correct harmonized image. The feature vector $b^+$ may be obtained based on the correct harmonized image with the use of the trained feature extractor.

The learning module 316 further executes learning of the parameter map estimation model M so as to increase the degree of similarity between at least one learning low-resolution parameter set to one pixel and at least one learning low-resolution parameter set to a pixel adjacent to the one pixel in the learning low-resolution parameter map.

Specifically, the learning module 316 executes learning of the parameter map estimation model M so that a smooth loss function L$_{smooth}$ shown in Equation 5 below decreases.

$$\mathcal{L}_{smooth} = \frac{1}{C}\sum_{k}\|\nabla\Theta_k\|_2 \qquad \text{[Equation 5]}$$

In Equation 5 given above, $\|\nabla\Theta_k\|_2$ represents a magnitude of a gradient of a learning low-resolution parameter set to a k-th pixel in the learning low-resolution parameter map.

3-2. Functions as Image Harmonization System

As illustrated in FIG. 3B, an image data storage module 318, a composite image acquisition module 320, a mask image acquisition module 322, a low-resolution composite image acquisition module 324, a low-resolution mask image acquisition module 326, the model storage module 308, a low-resolution parameter map acquisition module 328, an original-resolution parameter map acquisition module 330, and a harmonized image acquisition module 332 are further implemented in the image processing system 1. The image data storage module 318 and the model storage module 308 are implemented mainly by the storage unit 12. The composite image acquisition module 320, the mask image acquisition module 322, the low-resolution composite image acquisition module 324, the low-resolution mask image acquisition module 326, the low-resolution parameter map acquisition module 328, the original-resolution parameter map acquisition module 330, and the harmonized image acquisition module 332 are implemented mainly by the control unit 10.

Image Data Storage Module

The image data storage module 318 stores the composite image 200 and the mask image 202. Details of the composite image 200 and the mask image 202 are as described in the section [2-1. Acquisition of Composite image and Mask Image], and descriptions of the details are accordingly omitted here.

Composite Image Acquisition Module

The composite image acquisition module 320 (first-image acquisition means) acquires the composite image 200 (a first image) (FIG. 2A). In the at least one embodiment, the composite image acquisition module 320 acquires the composite image 200 stored in the image data storage module 318. However, the composite image 200 may be recorded on another device or an information storage medium, and the composite image acquisition module 320 may acquire the composite image 200 from the device or the information storage medium.

Mask Image Acquisition Module

The mask image acquisition module 322 (first-mask image acquisition means) acquires the mask image 202 (a first mask image) (FIG. 2A). In the at least one embodiment, the mask image acquisition module 322 acquires the mask image 202 stored in the image data storage module 318. However, the mask image 202 may be recorded on another device or an information storage medium, and the mask image acquisition module 322 may acquire the mask image 202 from the device or the information storage medium.

Low-Resolution Composite Image Acquisition Module

The low-resolution composite image acquisition module 324 (second-image acquisition means) acquires, based on the composite image 200, the low-resolution composite image 200d (a second image) having the second resolution (FIG. 2A). Specifically, the low-resolution composite image acquisition module 324 acquires the low-resolution composite image 200d by a reduction in resolution (down-sampling) of the composite image 200. Interpolation for the reduction in resolution is executable by the same method as the interpolation methods for the learning low-resolution composite image, and description thereof is accordingly omitted here.

Low-Resolution Mask Image Acquisition Module

The low-resolution mask image acquisition module 326 (second-mask image acquisition means) acquires, based on the mask image 202, the low-resolution mask image 202d (a second mask image) having the second resolution (FIG. 2A). Specifically, the low-resolution mask image acquisition module 326 acquires the low-resolution mask image 202d by a reduction in resolution (down-sampling) of the mask image 202. Interpolation for the reduction in resolution is executable by the same method as the interpolation methods for the learning low-resolution mask image, and description thereof is accordingly omitted here.

Low-Resolution Parameter Map Acquisition Module

The low-resolution parameter map acquisition module 328 (second-parameter map acquisition module) acquires the low-resolution parameter map 204d (a second parameter map) having the second resolution by inputting the low-resolution composite image 200d and the low-resolution mask image 202d into the parameter map estimation model M (see FIG. 2A). Here, parameters of the parameter map estimation model M that are used by the low-resolution parameter map acquisition module 328 have been adjusted by learning of the learning module 316. Details of the low-resolution parameter map 204d are as described in the section [2-3. Acquisition of Low-resolution Parameter Map], and description on the details is accordingly omitted here.

Original-Resolution Parameter Map Acquisition Module

The original-resolution parameter map acquisition module 330 (first-parameter map acquisition means) acquires, based on the low-resolution parameter map 204d, the original-resolution parameter map 204 (a first parameter map) (see FIG. 2A). Specifically, the original-resolution parameter map acquisition module 330 acquires the original-resolution parameter map 204 by an increase in resolution (up-sampling) of the low-resolution parameter map 204d. Interpolation for the increase in resolution is executable by the same method as the interpolation methods for the learning original-resolution parameter map, and description thereof is accordingly omitted here.

Harmonized Image Acquisition Module

The harmonized image acquisition module 332 (color-adjusted image acquisition means) calculates the harmonized pixel value vector (a color-adjusted pixel value vector), which is output of the transformation function, thereby acquires the harmonized image 206 (a color-adjusted image) including the harmonized pixel (a color-adjusted pixel), which has a color indicated by the harmonized pixel value vector (see FIG. 2B).

The transformation function is defined by the formula including the term of the product of the pixel value vector and the transformation matrix. The pixel value vector indicates a color of each one of the plurality of target pixels of the composite image 200. In the at least one embodiment, the pixel value vector is a three-dimensional vector having, as elements, an R value, a G value, and a B value of the one of the plurality of target pixels. The transformation matrix has, as elements, the plurality of transformation parameters set to the target pixels in the original-resolution parameter map 204.

The transformation function is an affine transformation including the product of the pixel value vector and the transformation matrix. Specifically, the formula that defines the transformation function is expressed by a sum of a term that is a product of the pixel value vector and the transformation matrix having, some of the transformation as elements, parameters set to a pixel that are related to the pixel value vector in the original-resolution parameter map 204, and a term of a transformation vector having, as elements, some others of the transformation parameters set to the pixel that are related to the pixel value vector in the original-resolution parameter map 204. Specifics of the formula are similar to the case of the learning transformation function, and description thereof is accordingly omitted (see Equation 1). That is, the formula that defines the transformation function has the same format as the format of the formula that defines the learning transformation function, and only differs in parameters from the latter function. It can be said that the harmonized image acquisition module 332 maps the pixel value vector to the harmonized pixel value vector in the same color space by the transformation function.

4. PROCESSING EXECUTED IN IMAGE PROCESSING SYSTEM

Figure 5B:
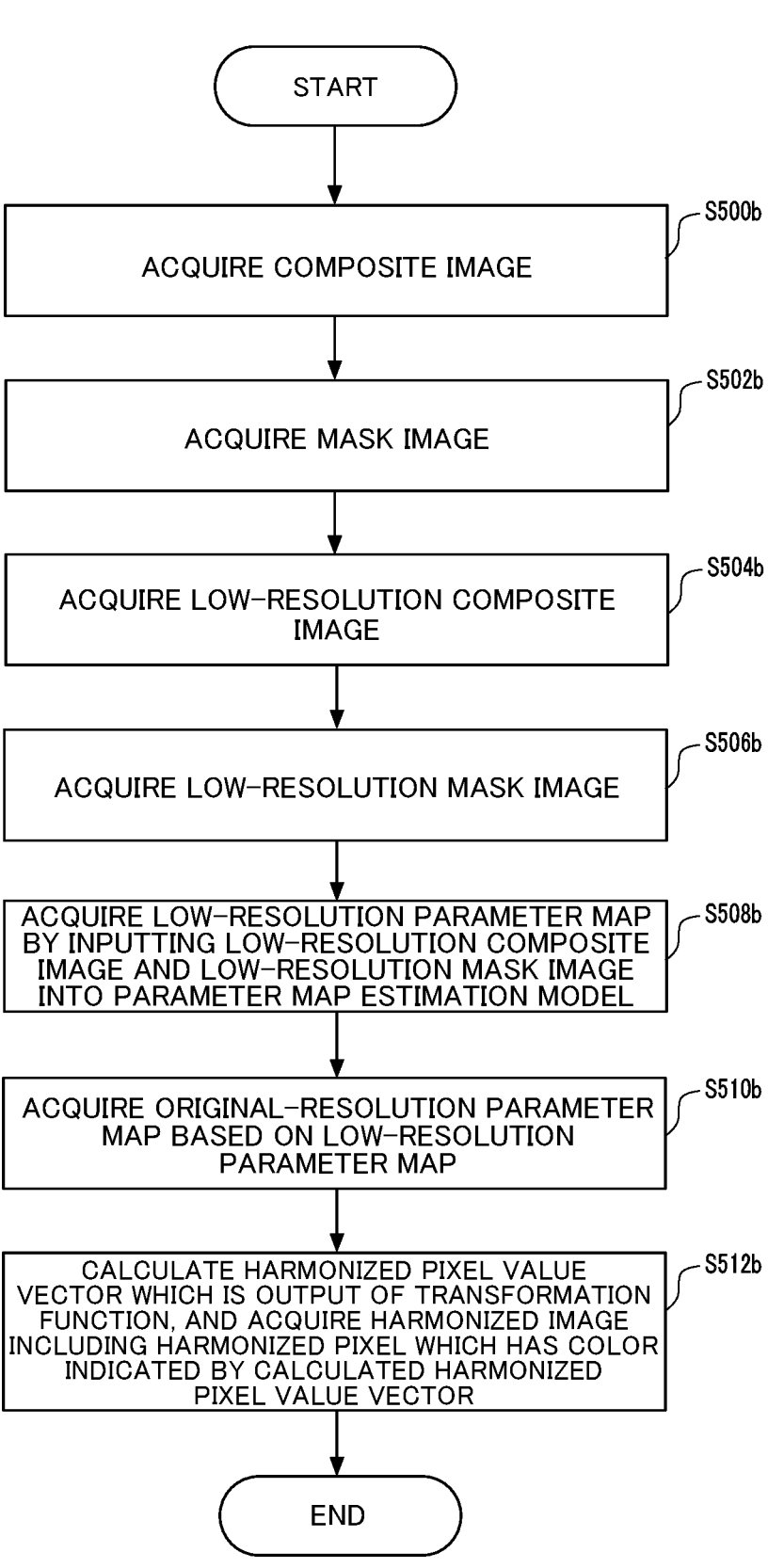
FIG. 5B is another flow chart for illustrating an example of processing executed in the image processing system.

FIG. 5A and FIG. 5B are each a flow chart for illustrating an example of processing executed in the image processing system 1. The flow chart of FIG. 5A is illustration of, out of the processing executed in the image processing system 1, processing related to learning. The flow chart of FIG. 5B is illustration of, out of the processing executed in the image processing system 1, processing related to image harmonization. The processing illustrated in FIG. 5A and the processing illustrated in FIG. 5B are executed by the control unit 10 by operating in accordance with a program stored in the storage unit 12.

4-1. Processing Related to Learning

As illustrated in FIG. 5A, the control unit 10 acquires the training data including the learning composite image, the learning mask image, and the correct harmonized image (Step S500a). The control unit 10 acquires the learning low-resolution composite image based on the learning composite image (Step S502a), and also acquires the learning low-resolution mask image based on the learning mask image (Step S504a).

The control unit 10 acquires the learning low-resolution parameter map by inputting the learning low-resolution composite image and the learning low-resolution mask image into the parameter map estimation model M (Step S506a). Next, the control unit 10 acquires the learning original-resolution parameter map based on the learning low-resolution parameter map (Step S508a).

The control unit 10 calculates the learning harmonized pixel value vector, which is output of the learning transformation function, and acquires the learning harmonized image including the learning harmonized pixel, which has a color indicated by the learning harmonized pixel value vector (Step S510a).

The control unit 10 executes learning of the parameter map estimation model M based on the learning harmonized image and the correct harmonized image (Step S512a). Specifically, the control unit 10 executes learning of the parameter map estimation model M so as to decrease values of the loss function L, the contrastive loss function LCR, and the smooth loss function $L_{smooth}$ described above. When the values of the loss functions become satisfactorily small in the middle of learning, the control unit 10 ends the learning at that point. In a case in which those values do not decrease satisfactorily, the control unit 10 may end the learning after repeating the learning a predetermined number of times. Publicly-known methods are usable for the learning, and, for example, error back-propagation, Adam, and RMSProp may be used.

When it is determined that the learning is not to be ended (Step S514a: N), the control unit 10 repeats the processing steps of Step S500 to Step S512. When it is determined that the learning is to be ended (Step S514a: Y), the control unit 10 ends this processing.

4-2. Processing Related to Image Harmonization

As illustrated in FIG. 5B, the control unit 10 acquires the composite image 200 (Step S500b) and acquires the mask image 202 as well (Step S502b). The control unit 10 acquires the low-resolution composite image 200d based on the composite image 200 (Step S504b), and also acquires the low-resolution mask image 202d based on the learning mask image (Step S506b).

The control unit 10 acquires the low-resolution parameter map 204d by inputting the low-resolution composite image 200d and the low-resolution mask image 202d into the parameter map estimation model M (Step S508b). The control unit 10 acquires the original-resolution parameter map 204 based on the low-resolution parameter map 204d (Step S510b). The control unit 10 calculates the harmonized pixel value vector, which is output of the transformation function, thereby acquires the harmonized image 206 including the harmonized pixel, which has a color indicated by the harmonized pixel value vector (Step S512b), and ends this processing.

5. SUMMATION

According to the image processing system 1 of the at least one embodiment described above, the use of a machine learning model that has been used in image harmonization of the related art and that outputs a harmonized image from a composite image and a mask image input thereto is avoidable. As a result, the calculation cost required for image harmonization can be reduced and image harmonization of a high-resolution composite image can be accomplished at a low calculation cost.

The image processing system 1 according to the at least one embodiment calculates the harmonized pixel value vector, which is output of the transformation function defined by the formula including the term of the product of the pixel value vector that indicates a color of each of the plurality of target pixels of the composite image 200, and the transformation matrix having, as elements, the plurality of transformation parameters set to the plurality of target pixels in the original-resolution parameter map 204, and acquires the harmonized image 206 including the harmonized pixel, which has a color indicated by the harmonized pixel value vector. That is, in the image processing system 1, pixel values of the plurality of target pixels of the composite image 200 are, based on one type of parameter set, directly transformed to pixel values of pixels in the harmonized image 206 (harmonized pixels) that correspond to the plurality of target pixels, and the process of learning and image harmonization is accordingly simplified, with the result that learning and image harmonization are accomplished at a high efficiency.

In the image processing system 1 according to the at least one embodiment, the transformation function is an affine transformation including the product of the pixel value vector and the transformation matrix, and the transformation matrix is a symmetric matrix. The use of the affine transformation including the transformation matrix that is a symmetric matrix as the transformation function improves precision of learning and image harmonization more as shown in FIG. 6.

In the image processing system 1 according to the at least one embodiment, the error of the learning harmonized image with respect to the correct harmonized image is normalized based on the learning mask image (see Equation 2). The value of the error is thus independent of the size of the area originating from the foreground image (an area occupied by the target pixels), and stable learning is accordingly accomplished.

In the image processing system 1 according to the at least one embodiment, learning of the parameter map estimation model M is executed so as to increase the degree of similarity between the learning harmonized image and the correct harmonized image, and, at the same time, so as to decrease the degree of similarity between the learning harmonized image and the incorrect harmonized image, which differs from the correct harmonized image. The precision of learning is accordingly improved more.

In addition, in the image processing system 1 according to the at least one embodiment, learning of the parameter map estimation model M is executed so as to increase the degree of similarity between at least one learning low-resolution parameter set to one pixel in the learning low-resolution parameter map and at least one learning low-resolution parameter set to a pixel adjacent to the one pixel in the learning low-resolution parameter map. The precision of learning is accordingly improved even more.

6. MODIFICATION EXAMPLES

The present invention is not limited to the at least one embodiment described above. The specific character string and numerical values given above as well as the specific character strings and numerical values in the drawings are examples, and the present invention is not limited to those character strings and numerical values.

6-1. Modification Example 1

In the at least one embodiment, a case in which the learning pixel value vector is a three-dimensional vector having, as elements, the R value, the G value, and the B value of a learning target pixel related to the learning pixel value vector is described. However, the learning pixel value vector may be a vector of four or higher dimensions based on the R value, the G value, and the B value of a target pixel related to the learning pixel value vector. For example, the learning pixel value vector may include, as an element, a product of at least two components out of the three components of the pixel values related to the learning pixel value vector. The learning pixel value vector may also include, as an element, a square of at least one component of the pixel values related to the learning pixel value vector. The learning pixel value vector p in Modification Example 1 is expressed by Equation 6 below.

$$p = \left(p_R, \; p_G, \; p_B, \; p_R p_G, \; p_R p_B, \; p_G p_B, \; p_R^2, \; p_G^2, \; p_B^2\right)^T \qquad \text{[Equation 6]}$$

A formula that defines a learning transformation function in Modification Example 1 is expressed by a product of the learning pixel value vector described above and the learning transformation matrix as shown in Equation 7 below. The learning transformation function in Modification Example 1 is linear transformation. As shown in Equation 7, the learning transformation matrix $W_\theta$ in Modification Example 1 has twenty-seven learning transformation parameters as elements. Accordingly, in Modification Example 1, twenty-seven low-resolution transformation parameters are set to each pixel of the learning low-resolution parameter map, and twenty-seven transformation parameters are set to each pixel of the learning original-resolution parameter map. Details of the pixel value vector related to the composite image 200, the transformation function, the low-resolution parameter map 204*d*, and the original-resolution parameter map 204 in Modification Example 1 are the same as the learning pixel value vector, the learning transformation function, the learning low-resolution parameter map, and the learning original-resolution parameter map described above. According to Modification Example 1, the increased number of transformation parameters enables learning and image harmonization at a higher precision.

$$\hat{I}_{i,j} = W_\theta \cdot p \qquad \text{[Equation 7]}$$

$$W_\theta = \begin{pmatrix} \theta_1 & \theta_2 & \theta_3 & \theta_4 & \theta_5 & \theta_6 & \theta_7 & \theta_8 & \theta_9 \\ \theta_{10} & \theta_{11} & \theta_{12} & \theta_{13} & \theta_{14} & \theta_{15} & \theta_{16} & \theta_{17} & \theta_{18} \\ \theta_{19} & \theta_{20} & \theta_{21} & \theta_{22} & \theta_{23} & \theta_{24} & \theta_{25} & \theta_{26} & \theta_{27} \end{pmatrix}$$

6-2. Modification Example 2

In the at least one embodiment, a case of using a CNN as the parameter map estimation model M is described. The parameter map estimation model M, however, may be a machine learning model other than a CNN. For example, the parameter map estimation model M may be a transformer model. The transformer model may be a so-called vision transformer, which is a transformer model specialized for image processing.

Figure 7:
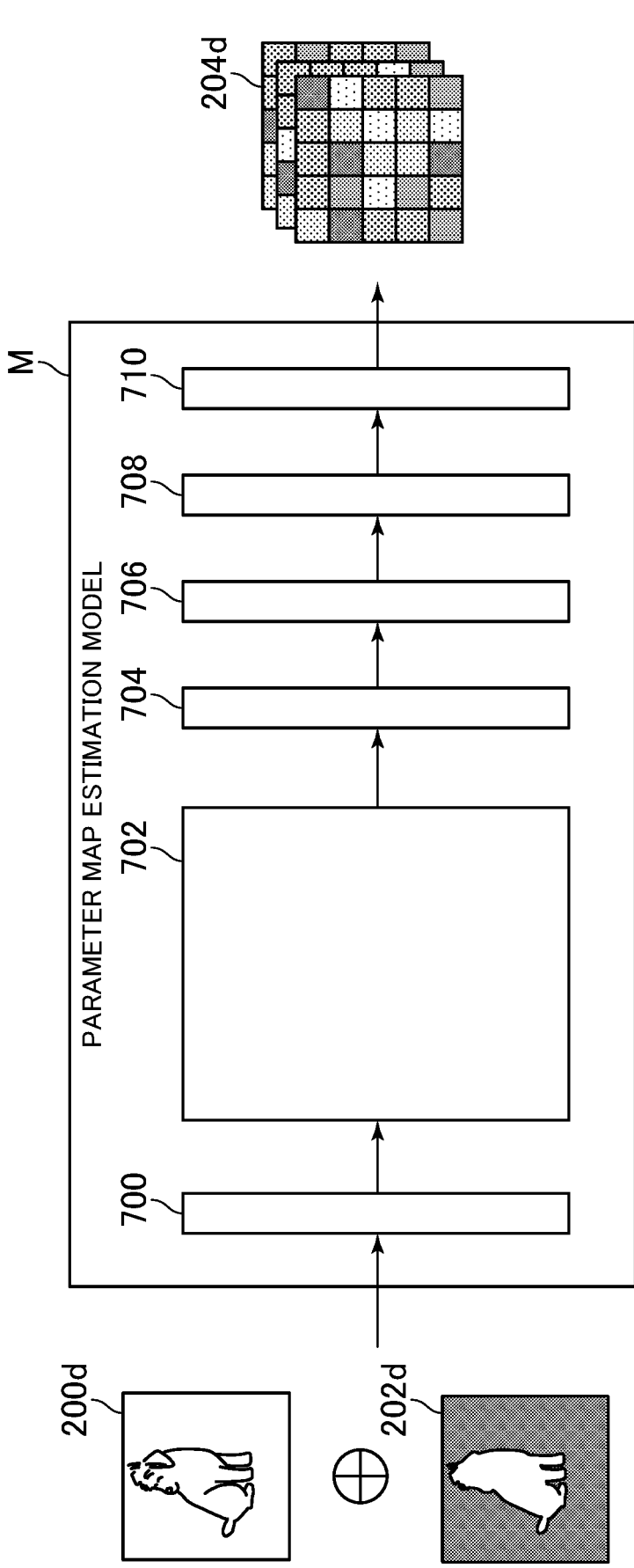
FIG. 7 is a diagram for illustrating a modification example of the parameter map estimation model.

Specifically, as illustrated in FIG. 7, the parameter map estimation model M in Modification Example 2 includes a patch embedding module 700, a transformer encoder module 702, a transposed convolution module 704, an activation module 706, and a dimension adjustment module 708. As specific configurations of the patch embedding module 700, the transformer encoder module 702, the transposed convolution module 704, and the activation module 706, configurations as described in Reference Document 1 (Alexey Dosovitskiy et al., "An Image is Worth 16×16 Words: Transformers for Image Recognition at Scale," arXiv preprint arXiv: 2010.11929, 2020), for example, are usable. Details of the dimension adjustment module 708 are the same as the dimension adjustment module 404, and description thereof is accordingly omitted here.

6-3. Other Modification Examples

In the at least one embodiment, a case in which the image processing system 1 executes learning of the parameter map estimation model M is described. However, learning of the parameter map estimation model M may be executed in another system.

In the at least one embodiment, a case in which the original-resolution parameter map acquisition module 330 of the image processing system 1 acquires the original-resolution parameter map 204 based on the low-resolution parameter map 204d is described. However, the image processing system 1 may not always include the original-resolution parameter map acquisition module 330. That is, when the transformation function includes a calculation related to interpolation, the low-resolution parameters set to each pixel of the low-resolution parameter map 204d may be used as parameters in the transformation function. In this case, it can be said that the original-resolution parameter map 204 is acquired in the processing of the harmonized image acquisition module 332. The same applies to the learning original-resolution parameter map acquisition module 312.

In the at least one embodiment, pixel values of only target pixels out of the pixels of the composite image 200 are provided to the processing of the harmonized image acquisition module 332. However, pixel values of pixels other than the target pixels out of the pixels of the composite image 200 may be provided to the processing of the harmonized image acquisition module 332 as well. For example, pixel values of pixels around the area originating from the foreground image in the composite image 200 may also be provided to the processing of the harmonized image acquisition module 332. This may improve affinity between the color of the area originating from the foreground image and the color of surroundings of the area more after the color transformation.

In short, modifications can be made as long as the harmonized image acquisition module 332 calculates a harmonized pixel value vector that is output of a transformation function defined by a formula including a term of a product of a pixel value vector that indicates a color of each of one or more adjustment pixels, which are one or more target pixels out of the pixels of the composite image 200, and a transformation matrix, thereby acquires the harmonized image 206 including a harmonized pixel that has a color indicated by the harmonized pixel value vector. The same applies to the learning harmonized image acquisition module 314.

In the at least one embodiment, a case in which there are a plurality of target pixels is described. However, it is sufficient if the number of target pixels is one or more.

In the at least one embodiment, a case in which the mask image 202 is a binary image is described. However, the present invention is not limited to this example. For instance, when the composite image 200 is an image created by compositing a plurality of foreground images and a single background image, a different value may be set for each area originating from one of the plurality of foreground images. In short, modifications can be made as long as the mask image 202 specifies one or more target pixels that are targets of color adjustment in the composite image 200. The same applies to the learning mask image.

In the at least one embodiment, a case in which the image processing system 1 is used for image harmonization is described. However, the present invention is applicable to technologies in general that are related to color adjustment of an image using a machine learning model.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image processing system, comprising at least one processor, the at least one processor being configured to:

acquire a first image having a first resolution;

acquire a first mask image, which has the first resolution and which specifies one or more target pixels as targets of color adjustment in the first image;

acquire, based on the first image, a second image having a second resolution lower than the first resolution;

acquire, based on the first mask image, a second mask image having the second resolution;

acquire a second parameter map having the second resolution by inputting the second image and the second mask image into a parameter map estimation model;

calculate a color-adjusted pixel value vector, which is output of a transformation function defined by a formula including a term of a product of a pixel value vector and a transformation matrix, wherein the pixel value vector indicates a color of each of one or more adjustment pixels, which are at least the one or more target pixels out of pixels of the first image, and the transformation matrix has, as elements, a plurality of transformation parameters set to each of one or more adjustment pixels in a first parameter map, which is the second parameter map increased in resolution and which has the first resolution; and acquire a color-adjusted image including a color-adjusted pixel, the color-adjusted pixel having a color indicated by the color-adjusted pixel value vector, wherein the parameter map estimation model is configured to be trained with use of training data including: a first learning image having the first resolution; a first learning mask image, which has the first resolution and which specifies one or more learning target pixels as targets of color adjustment in the first learning image; and a first correct color-adjusted image having the first resolution, so as to decrease an error of a first learning color-adjusted image with respect to the first correct color-adjusted image, wherein the first learning color-adjusted image includes a learning color-adjusted pixel, which has a color indicated by a learning color-adjusted pixel value vector, the learning color-adjusted pixel value vector being output of a learning transformation function defined by a formula in a same format as a format of the transformation function, the formula including a term of a product of a learning pixel value vector and a learning transformation matrix, wherein the learning pixel value vector indicates a color of each of one or more learning adjustment pixels, which are at least the one or more learning target pixels out of pixels of the first learning image, and the learning transformation matrix has, as elements, a plurality of learning transformation parameters set to each of one or more learning adjustment pixels in a first learning parameter map having the first resolution, wherein the first learning parameter map is a second learning parameter map increased in resolution, the second learning parameter map being output of the parameter map estimation model into which a second learning image and a second learning mask image are input, wherein the second learning image is the first learning image reduced in resolution and has the second resolution, and the second learning mask image is the first learning mask image reduced in resolution and has the second resolution.

2. The image processing system according to claim 1, wherein the at least one processor is configured to:

acquire, as the first image, a composite image of a foreground image and a background image; and acquire, as the first mask image, an image that specifies, as the one or more target pixels, one or more pixels originating from the foreground image in the composite image.

3. The image processing system according to claim 1, wherein the at least one processor is further configured to acquire the first parameter map based on the second parameter map.

4. The image processing system according to claim 1, wherein the transformation matrix is a symmetric matrix, and wherein the transformation function is an affine transformation including the product of the pixel value vector and the transformation matrix.

5. The image processing system according to claim 1, wherein the pixel value vector includes, as an element, a product of at least two components out of three components of pixel values related to the pixel value vector.

6. The image processing system according to claim 1, wherein the pixel value vector includes, as an element, a square of at least one component of pixel values related to the pixel value vector.

7. The image processing system according to claim 1, wherein the parameter map estimation model includes a transformer model.

8. The image processing system according to claim 1, wherein the error is normalized based on the first learning mask image.

9. The image processing system according to claim 8, wherein the parameter map estimation model is a machine learning model further trained so as to increase a degree of similarity between the first learning color-adjusted image and the first correct color-adjusted image, so as to decrease a degree of similarity between the first learning color-adjusted image and a first incorrect color-adjusted image, which differs from the first correct color-adjusted image.

10. The image processing system according to claim 9, wherein the first incorrect color-adjusted image is an image obtained by transforming pixel values of the one or more learning target pixels in the first correct color-adjusted image.

11. The image processing system according to claim 9, wherein the parameter map estimation model is a machine learning model further trained so as to increase a degree of similarity between at least one second learning transformation parameter set to one pixel in the second learning parameter map and at least one second learning transformation parameter set to a pixel adjacent to the one pixel in the second learning parameter map.

12. A learning system, comprising at least one processor, the at least one processor being configured to:

acquire training data including: a first learning image having a first resolution; a first learning mask image, which has the first resolution and which specifies one or more learning target pixels as targets of color adjustment in the first learning image; and a first correct color-adjusted image having the first resolution;

acquire, based on the first learning image, a second learning image having a second resolution lower than the first resolution;

acquire, based on the first learning mask image, a second learning mask image having the second resolution;

acquire a second learning parameter map having the second resolution by inputting the second learning image and the second learning mask image into a parameter map estimation model;

calculate a learning color-adjusted pixel value vector, which is output of a learning transformation function defined by a formula including a term of a product of a learning pixel value vector and a learning transformation matrix, wherein the learning pixel value vector indicates a color of each of one or more learning adjustment pixels, which are at least the one or more learning target pixels out of pixels of the first learning image, and the learning transformation matrix has, as elements, a plurality of learning transformation parameters set to each of one or more learning adjustment pixels in a first learning parameter map, which is the second learning parameter map increased in resolution and which has the first resolution;

acquire a learning color-adjusted image including a learning color-adjusted pixel, the learning color-adjusted pixel having a color indicated by the learning color-adjusted pixel value vector; and execute learning of the parameter map estimation model based on the learning color-adjusted image and the first correct color-adjusted image.

13. An image processing method, comprising:

acquiring a first image having a first resolution;

acquiring a first mask image, which has the first resolution and which specifies one or more target pixels as targets of color adjustment in the first image;

acquiring, based on the first image, a second image having a second resolution lower than the first resolution;

acquiring, based on the first mask image, a second mask image having the second resolution;

acquiring a second parameter map having the second resolution by inputting the second image and the second mask image into a parameter map estimation model;

calculating a color-adjusted pixel value vector, which is output of a transformation function defined by a formula including a term of a product of a pixel value vector and a transformation matrix, wherein the pixel value vector indicates a color of each of one or more adjustment pixels, which are at least the one or more target pixels out of pixels of the first image, and the transformation matrix has, as elements, a plurality of transformation parameters set to each of one or more adjustment pixels in a first parameter map, which is the second parameter map increased in resolution and which has the first resolution; and acquiring a color-adjusted image including a color-adjusted pixel, the color-adjusted pixel having a color indicated by the color-adjusted pixel value vector, wherein the parameter map estimation model is configured to be trained with use of training data including: a first learning image having the first resolution; a first learning mask image, which has the first resolution and which specifies one or more learning target pixels as targets of color adjustment in the first learning image; and a first correct color-adjusted image having the first resolution, so as to decrease an error of a first learning color-adjusted image with respect to the first correct color-adjusted image, wherein the first learning color-adjusted image includes a learning color-adjusted pixel, which has a color indicated by a learning color-adjusted pixel value vector, the learning color-adjusted pixel value vector being output of a learning transformation function defined by a formula in a same format as a format of the transformation function, the formula including a term of a product of a learning pixel value vector and a learning transformation matrix, wherein the learning pixel value vector indicates a color of each of one or more learning adjustment pixels, which are at least the one or more learning target pixels out of pixels of the first learning image, and the learning transformation matrix has, as elements, a plurality of learning transformation parameters set to each of one or more learning adjustment pixels in a first learning parameter map having the first resolution, wherein the first learning parameter map is a second learning parameter map increased in resolution, the second learning parameter map being output of the parameter map estimation model into which a second learning image and a second learning mask image are input, wherein the second learning image is the first learning image reduced in resolution and has the second resolution, and the second learning mask image is the first learning mask image reduced in resolution and has the second resolution.

14. A non-transitory computer-readable information storage medium having stored thereon a program for causing a computer to:

acquire a first image having a first resolution;

acquire a first mask image, which has the first resolution and which specifies one or more target pixels as targets of color adjustment in the first image;

acquire, based on the first image, a second image having a second resolution lower than the first resolution;

acquire, based on the first mask image, a second mask image having the second resolution;

acquire a second parameter map having the second resolution by inputting the second image and the second mask image into a parameter map estimation model;

calculate a color-adjusted pixel value vector, which is output of a transformation function defined by a formula including a term of a product of a pixel value vector and a transformation matrix, wherein the pixel value vector indicates a color of each of one or more adjustment pixels, which are at least the one or more target pixels out of pixels of the first image, and the transformation matrix has, as elements, a plurality of transformation parameters set to each of one or more adjustment pixels in a first parameter map, which is the second parameter map increased in resolution and which has the first resolution; and acquire a color-adjusted image including a color-adjusted pixel, the color-adjusted pixel having a color indicated by the color-adjusted pixel value vector, wherein the parameter map estimation model is configured to be trained with use of training data including: a first learning image having the first resolution; a first learning mask image, which has the first resolution and which specifies one or more learning target pixels as targets of color adjustment in the first learning image; and a first correct color-adjusted image having the first resolution, so as to decrease an error of a first learning color-adjusted image with respect to the first correct color-adjusted image, wherein the first learning color-adjusted image includes a learning color-adjusted pixel, which has a color indicated by a learning color-adjusted pixel value vector, the learning color-adjusted pixel value vector being output of a learning transformation function defined by a formula in a same format as a format of the transformation function, the formula including a term of a product of a learning pixel value vector and a learning transformation matrix, wherein the learning pixel value vector indicates a color of each of one or more learning adjustment pixels, which are at least the one or more learning target pixels out of pixels of the first learning image, and the learning transformation matrix has, as elements, a plurality of learning transformation parameters set to each of one or more learning adjustment pixels in a first learning parameter map having the first resolution, wherein the first learning parameter map is a second learning parameter map increased in resolution, the second learning parameter map being output of the parameter map estimation model into which a second learning image and a second learning mask image are input, wherein the second learning image is the first learning image reduced in resolution and has the second resolution, and the second learning mask image is the first learning mask image reduced in resolution and has the second resolution.

* * * * *